June 22, 1965  A. M. MARKS ETAL  3,191,077
POWER CONVERSION DEVICE
Filed April 27, 1962  2 Sheets-Sheet 1
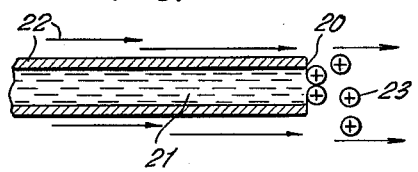
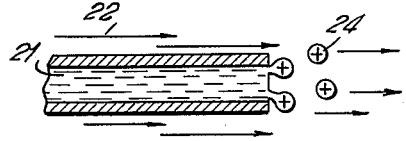
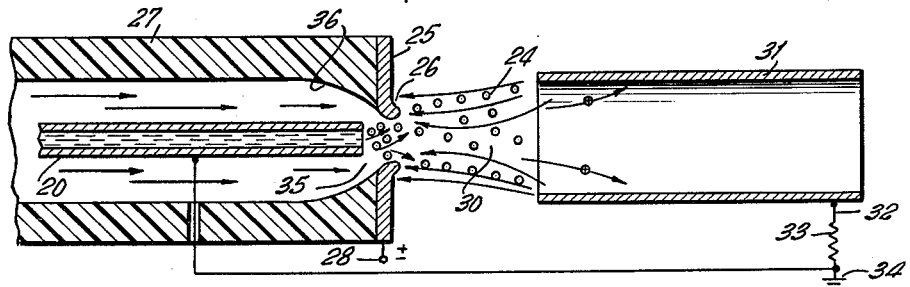
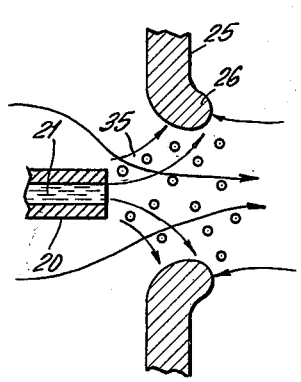
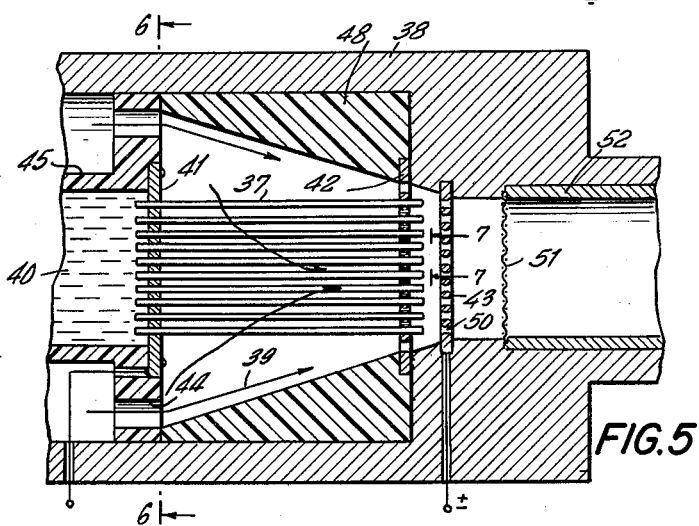
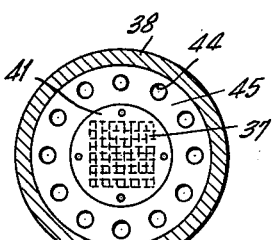
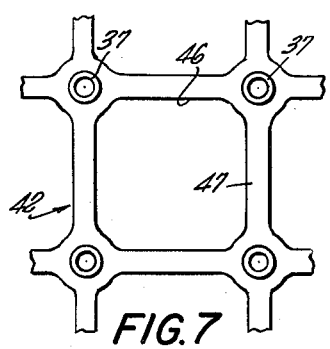
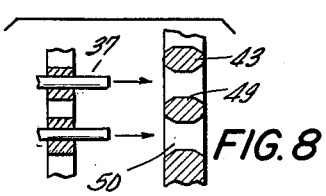
INVENTORS
ALVIN M. MARKS
ERNESTO BARRETO
BY Albert F. Kronman
ATTORNEY

INVENTORS
ALVIN M. MARKS
ERNESTO BARRETO
BY
ATTORNEY

United States Patent Office 3,191,077
Patented June 22, 1965

3,191,077
POWER CONVERSION DEVICE
Alvin M. Marks, Whitestone, and Ernesto Barreto, Jamaica, N.Y., assignors to Marks Polarized Corporation, Whitestone, N.Y., a corporation of New York
Filed Apr. 27, 1962, Ser. No. 190,762
4 Claims. (Cl. 310—5)

This invention relates to power conversion devices and particularly to devices which will change the internal and kinetic power of gas into electrical power.

It is well known to form an aerosol and charge it simultaneously, by means of passing a fluid such as water and the like through small capillaries and applying a high potential to the capillary tip or directly to the fluid. This method of forming and electrically charging an aerosol has been investigated as a purely physical effect and for possible utility in an electrostatic propulsion device to operate in the vacuum of space.

However, prior art studies of simultaneously formed and charged aerosols have failed to teach either the process or device for simultaneously forming and charging an aerosol within a stream of rapidly moving gas for the purpose of direct power conversion. In an earlier Patent No. 2,638,555 issued May 12, 1953 it was shown that a preformed aerosol, produced by a suitable aerosol generator, could be subsequently charged by the diffusion of ions produced by a corona field. However, because of limitations inherent in the diffusion process, a maximum charge per drop cannot be achieved, and considerable power is lost in maintaining the corona.

Accordingly, it is an object of the present invention to simultaneously form and charge an aerosol in the direct conversion of the internal and kinetic power of a gas into electrical power.

Another object of the present invention is to provide a power conversion device in which the power required to charge the aerosol is negligible compared with the total power which can be extracted from the gas.

A further object of the present invention is to convert the internal and kinetic power of a moving gas into electrical power without the requirement for moving mechanical parts.

Still another object of the present invention is to produce a light weight, inexpensive, maintenance free, power conversion device.

An object of the present invention is to provide a power conversion device which will operate at low or ambient room temperatures as well as at elevated temperatures.

An object of the present invention is to improve power conversion by efficiently creating charged aerosols having a high charge to mass ratio per drop, through the combined application of acceleration and electric forces.

An object of the present invention is to readily multiply available power output by providing modular conversion units capable of forming series or parallel assemblies with other similar units.

A feature of the present invention is its use of a stream of gas with a high energy content which can easily be transformed into a high velocity charged aerosol jet for the conversion of heat or kinetic power into electric power, or vice versa.

Another feature of the present invention is its use of an axially disposed capillary tube to inject the charged aerosol particles into the stream of gas.

A further feature of the present invention is the use of a cylindrical collector electrode disposed in the flow path of the aerosol to collect the charge from the droplets of the aerosol and establish the high field required for the conversion process.

A feature of the present invention is its application of electrical potential between a capillary liquid source and a charging ring in the path of the jet of gas.

The invention consists of the construction, combination and arrangement of parts, described and claimed.

In the accompanying drawings forming part hereof are illustrated several embodiments of the invention in which drawings similar reference characters designate corresponding parts and in which:

FIGURE 1 is a fragmentary view in longitudinal section of a capillary tube greatly enlarged showing the formation of charged droplets.

FIGURE 2 is a view similar to FIGURE 1 showing the dispersion of the charged droplets into an air stream forming a charged aerosol.

FIGURE 3 is a somewhat diagrammatic view in longitudinal section of a power conversion device according to the present invention.

FIGURE 4 is a fragmentary view on an enlarged scale in longitudinal section of the end of a capillary tube and a charging ring in accordance with the present invention.

FIGURE 5 is a somewhat diagrammatic view of a power conversion device using a plurality of capillary tubes.

FIGURE 6 is a cross sectional view taken on line 6—6 in FIGURE 5.

FIGURE 7 is a cross sectional view taken on line 7—7 in FIGURE 5, greatly enlarged.

FIGURE 8 is a fragmentary end view of the capillary support shown in FIGURE 5.

Figure 9:
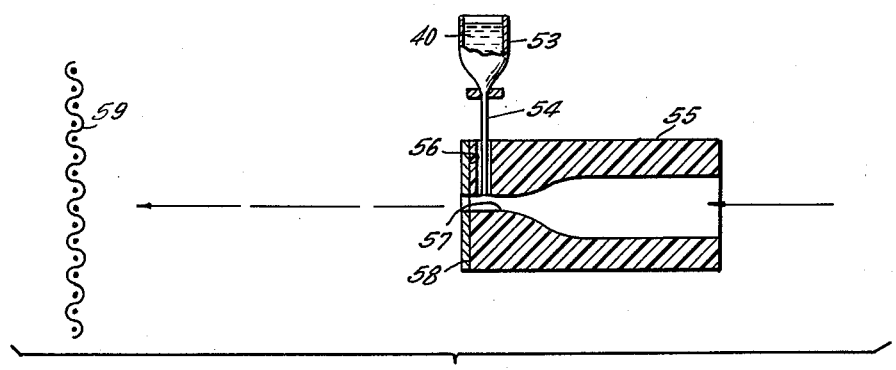
FIGURE 9 is a somewhat diagrammatic view in longitudinal section of a power conversion device according to the present invention employing a laterally disposed fluid dispenser.

Referring to the drawings and specifically to FIGURES 1 and 2, 20 indicates a capillary tube which may be of insulating material such as glass or some electrically conductive material such as copper, steel or the like. A suitable device for this purpose may be a hypodermic needle such as a No. 27 hypodermic needle having a bore therein of 0.2 mm. I.D.

Fluid 21 such as water, glycerol, formamide, or a liquid such as Woods metal, mercury or NaK eutectic is forced under pressure through the capillary 20 and out of the dispensing end thereof. An electrically conducting path is established through the fluid 21 either directly (where the capillary tube is of insulating material) or by way of the capillary tube where conductive material is used.

A stream of gas as air, nitrogen, Freon, or a vapor such as steam, is directed at a suitable velocity around the capillary tube 20 in the direction indicated by the arrows shown in FIGURES 1 and 2.

As shown in FIGURE 1 charged droplets 23 will form on the end of the capillary 20 by reason of the fluid 21 being forced out of the said capillary, under the influence of an intense electric field and the acceleration forces of the gas. As the droplets enter the gas 22 they explode into many droplets of micron or submicron size forming the charged aerosol indicated at 24 in FIGURE 2.

Referring to FIGURE 4 there is shown a charging ring 25 which is disposed in the path of the aerosol 24 as it leaves the capillary 20. The charging ring 25 is formed with a central nozzle 26 of some suitable electrically conducting material such as aluminum, stainless steel, or tungsten, or the like. The nozzle 26 confines and transports the charged droplets of the aerosol which are directed in a concentrated stream away from the capillary 20.

Referring to FIGURE 3 there is shown a somewhat diagrammatic longitudinal section of a power conversion unit incorporating the capillary 20 and charging ring 25 referred to above. The capillary 20 is axially mounted within gas conduit 27 comprising a dielectric material such as Lucite, glass, ceramic or the like. The charging ring 25 is secured to the front of the conduit 27 and a short distance away from the end of the capillary 20.

A difference in potential is applied between the charging ring 25 and the capillary 20. The source of potential is preferably connected to the charging ring 25 with a capillary 20 grounded at 34, as indicated in FIGURE 3. As shown in FIGURE 3 the nozzle 26 of the charging ring 25 directs the aerosol 24 through the conversion space generally indicated at 30 in FIGURE 3 and into cylinder 31, which constitutes the charge collector or collector electrode.

As the droplets 23 of the charged aerosol leave the capillary 20 they pass through a space 35 between the end of the capillary 20 and the end of the charging ring nozzle 26. The accelerating electric field in the space 35 assists the droplets to accelerate to the gas velocity. The electric field also aids in the formation of the charged droplets from the capillary tube by shielding them from the interference from the opposing electric field of the collector electrode 31 which is indicated by the arrows 24 in FIGURE 3. The elongated nozzle 26 of the charging ring 25 provides a field free section which acts as a drift space and enables the charged droplets to reach gas velocity. Moreover, in the formation and charging of the aerosol the collector potential tends to reverse the process, and the device is not operative without the charging ring. The drift space augments the effect of the charging ring so that the droplets 23 leave the nozzle 26 almost at gas velocity and are enabled to traverse the conversion space 30 against the opposing field and enter the cylindrical collector electrode 31.

The collector electrode 31 is axially disposed in the path of the aerosol 24 for the purpose of collecting the charge from the aerosol droplets. The charge on the aerosol droplets 24 has been indicated by small plus signs in FIGURES 1 and 2. However, it is to be understood that the charge on the aerosol droplets may also be negative. The droplets diverge within the collector 31 due to mutual repulsion within the collector walls and discharge upon the collector walls permitting the gas to flow without obstruction.

The collector 31 is connected by a lead 32 to a load 33 which in turn is connected to ground 34.

It is preferable to work with droplets having a radius of $10^{-1}$ to $10^{-3}$ microns. Capillary tubes having an I.D. of 0.2 mm. or less are preferred. Smaller capillaries will produce smaller charged droplets thereby imparting to the aerosol a higher charge to mass ratio. With smaller capillaries the droplets break up into smaller particles collectively capable of picking up a greater charge per unit of mass.

Using tubing having an internal diameter of 0.2 mm. the applicant was able to get 375 amperes per square meter of capillary surface. By using numerous small capillaries to form a high density array as hereinafter more fully described, the current and power output of the conversion device may be substantially increased. By providing for an axial alignment of the capillary with respect to the flow axis of the gas stream, the charged aerosol droplets are injected into the gas with an initial forward motion thus adding the energy of the liquid to the kinetic power of the gas. While the conduit 27 is illustrated in FIGURE 3 with a constriction 36 at the discharge end thereof it will be apparent that if the velocity of the gas is sufficiently great the constriction 36 may be eliminated. The constriction 36 is for the purpose of increasing the velocity of the gas as it approaches the drift space and increasing the velocity through the drift space area of the charging ring.

If the load 33 is connected directly back to the capillary 20 as shown in FIGURE 3 and the charging ring 25 given a potential relative to the said capillary, the charging current becomes negligible and amounts to less than 1% of the power delivered by the conversion device. It will thus be seen that there is provided a very efficient method of simultaneously charging and forming an aerosol.

A liquid from a tube entering air not in motion requires the application of potential differences in excess of 2,500 volts to produce a charged aerosol spray. The production of many very fine $(.001$–$0.1\mu)$ charged droplets is essential to the efficient performance of the present power conversion device. Without the electrical field the stream will produce very large droplets of the order of $(1$–$100\mu)$ with substantially no net charge by the well known "atomization" process. Such droplets produce a neutral aerosol, which even if charged would be too large to carry sufficient charge for efficient power conversion.

The applicant's "electrojet" principle combines the motion of the stream and an electric field applied to a capillary tube, in which the liquid is under a positive pressure differential, to produce new and unexpected results not obtainable by either gas "atomization," or a high voltage field, alone; namely, the efficient production of submicron charged droplets of approximately uniform size, with voltages in the 100–2500-volt range and to simultaneously form, charge and introduce the aerosol droplets into a gas stream, with currents of the order of $12\mu a.$ per capillary, at a current density of 375 amps/m.$^2$ To increase the output of the power conversion device such as is shown in FIGURE 3 an array of capillary tubes such as are shown in the embodiment illustrated in FIGURES 5 through 8 may be provided.

In this form of the invention a plurality of capillary tubes 37 are mounted in an array within a housing 38. Gas at a suitable velocity is forced through the housing 38 as indicated by the arrows 39 and around openings 44 in the conduit 45. A suitable liquid, such as water, under pressure indicated at 40 in FIGURE 5 is led through the conduit 45 and into the capillary tubes 37. The inner end of the capillaries are held within a support block 41 illustrated in FIGURES 5 and 6. The capillary tubes have been illustrated somewhat diagrammatically by the small squares at the center of FIGURE 6. The front end of the capillaries are held by a support lattice 42 a fragment of which is illustrated in FIGURE 7. The lattice is provided with openings 46 between the supporting portion 47 thereof to permit the gas to flow freely with a minimum of friction loss. It will be understood that the lattice illustrated in FIGURE 7 is on a greatly enlarged scale for the purpose of illustration.

A charging grid 43 is secured to the front of the conduit nozzle 48, and as shown on a greatly enlarged scale in FIGURE 8, is provided with a plurality of openings 49 therein through which the droplets from the capillaries 37 are directed. The thickness of the grid 43 constitutes a drift space within which the droplets can reach gas velocity. The charging grid 43 also acts to shield the capillaries from the reverse field originating on the collector screen 51, which would otherwise inhibit the formation of charged droplets of the same sign as the collector charge. A necessary condition for power conversion is the effective production of a charged aerosol at the capillary tubes.

Between the charging plate 43 and the capillaries 37 there is maintained a forward direction of the potential field compared to the reverse direction of the potential field between the collector screen 51 and the plate 43. In the manner hereinabove described with respect to FIGURES 1 through 4, the charged aerosol particles are directed at the screen member 51 disposed across the entrance to the collector cylinder 52. The collector screen 51 has a potential which has the same sign charge as that on the droplets, and provides a parallel electric field opposing the motion of the charged droplets and gas. The aerosol droplets thus produced have a very small mobility producing very little slip relative to the gas in the presence of the strong electric field. The charged droplets thus act as an effective transducer thus causing an efficient transfer of gas power to electric power.

With an array as illustrated in FIGURES 4 and 6 having approximately 400 capillary tubes per square centimeter, there may be obtained a current of four milliamperes per square centimeter or forty amperes per square meter. At a potential difference of 25,000 volts the power conversion is 1 megawatt/m.$^2$.

Figure 10:
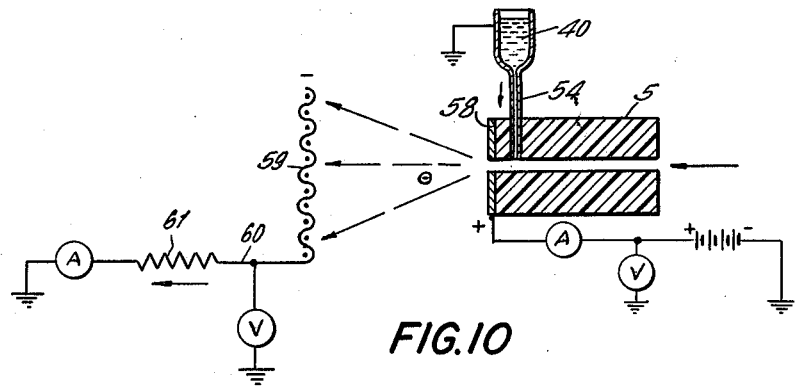
FIGURE 10 is a view similar to FIGURE 9 showing the associated electrical circuits.

While the capillaries shown in connection with FIGURES 1 through 8 have been disposed parallel with the path of the gas so as to add the initial velocity of the fluid to the velocity of the gas, it is within the purview of the present invention to apply the fluid to the gas stream by means of a capillary disposed normal to the path of the gas as illustrated in FIGURES 9 and 10. In this embodiment of the invention a source of fluid 53 which may be any suitable container is connected to the capillary 54 which in turn is led into the convergent nozzle 55 through an opening 56 in the wall thereof. A suitable gas is directed through the nozzle 55 and into the throat 57 where the gas under increased velocity is combined with the droplets coming from the capillary 54 to form the aerosol. As shown in FIGURE 10 a source of potential is connected to the charging ring 58 so that the droplets appearing at the end of the capillary 54 are charged.

Figure 11:
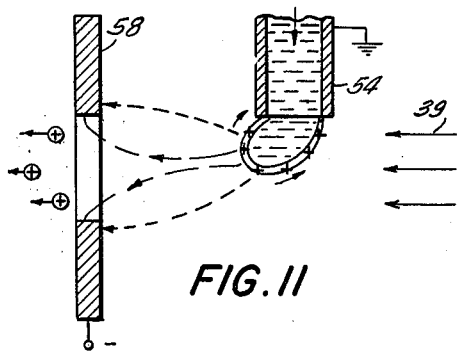
FIGURES 11 and 12 are diagrammatic views greatly enlarged showing the manner in which the droplets are charged.
Figure 12:
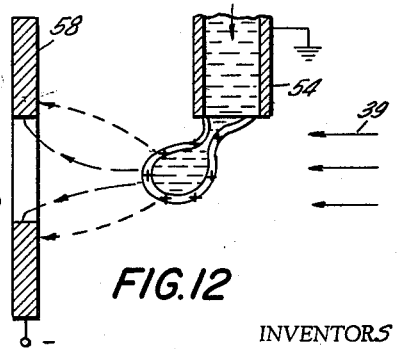

In FIGURES 11 and 12 there has been schematically illustrated the manner in which the charge collects on the outside of the droplets as they emerge from the capillary 54. As stated above the charge causes the droplets to explode into very small charged droplets which are driven by the gas indicated by the arrows 39 toward the charging ring 58 on the exit end of the nozzle 55. While only one droplet is illustrated, it is believed a great number are formed simultaneously. FIGURE 12 illustrates the droplet at the moment of leaving the capillary 54 and as it is about to explode into the aerosol.

The aerosol droplets pass through the charging ring 58 and the charge on the droplets is collected upon the screen 59 as the aerosol passes therethrough. The collector screen 59 is connected by a lead 60 to a load 61 which in turn is connected to ground. It is to be understood that the cylindrical collector electrode 31 hereinabove illustrated and referred to may be used in conjunction with the embodiment shown in FIGURES 9 and 10. In FIGURE 10 the nozzle structure is not provided with a convergent throat 57 but rather a straight conduit of suitable diameter for the gas is provided to insure sufficient gas velocity therethrough. The general principles of power conversion set forth in connection with FIGURES 1 through 8 also apply to the embodiments shown in FIGURES 9 and 10.

From the foregoing it will be seen that there has been provided a highly efficient power conversion unit, employing an aerosol which is simultaneously formed and charged from an axial jet. No moving parts other than that of the gas aerosol are required for converting the kinetic power of a gas directly into electrical power.

The charged aerosol is an efficient transducer between the internal and kinetic power of a gas stream, and the electric power applied to an electric circuit.

The principles employed herein may be adapted to an electrostatic aerosol pump, or an electrojet propulsion device without departing from the scope of this invention, by applying an accelerating instead of a decelerating potential to the collector.

When applied to power conversion the term suitable velocity as used throughout this application is meant to include velocities of the order of between .5 to 1 Mach.

It is preferred to operate the power conversion unit herein described at pressures above atmospheric pressure. Pressures of the order of 5, 10, or even 100 atmospheres have been found to be suitable. Under these conditions higher potentials can be applied to the droplets of the aerosol during formation, with the result that smaller more highly charged droplets and greater current densities are obtained. Higher pressures further serve to reduce spark breakdown within the system, making it possible to operate with shorter distances between the collector electrode and the charging plate. These shorter distances further reduce the space charge limitations on the current density and thus enables increased current density. The gas, being of greater density can deliver more power per unit volume. The mobility of the charged droplets is decreased, and frictional power losses due to slip between the charged particles and the gas is reduced.

When the charge to mass ratio is increased water films do not form upon the walls of the collector electrode and electrical leakage is minimized.

It is understood that the various supports and screens herein described are to be constructed in accordance with well known aerodynamic principles and given air-foil shape to minimize gas friction losses, as shown in FIGURE 8.

Having thus fully described the invention what is claimed as new and sought to be secured by Letters Patent of the United States, is:

1. A power conversion device comprising a conduit for conducting gas at a suitable velocity, a source of gas connected to said conduit, a capillary tube communicating with the interior of the conduit, a dispensing end on the capillary tube, a source of liquid connected to the capillary tube, a charging ring spaced from the dispensing end of the capillary tube, an outwardly extending central nozzle in the charging ring to receive the liquid coming from the conduit, a source of potential for applying a concentrated electric field between the charging ring and said capillary tube ends in the presence of the gas stream to simultaneously form and charge an aerosol, a charge collector spaced from the charging ring to receive and discharge the aerosol and an electrical load connected to the collector to receive the power converted from the gas.

2. A power conversion device comprising a conduit for conducting gas at a suitable velocity, a source of gas connected to said conduit, a plurality of capillary tubes communicating with the interior of the conduit and disposed parallel to the longitudinal axis of the conduit, a dispensing end on the capillary tubes, a source of liquid connected to the capillary tubes, a charging electrode spaced from the dispensing end of the capillary tubes, said charging electrode having openings therein to receive the gas and liquid coming from the conduit, said openings each provided with a nozzle, a source of potential for applying a concentrated electric field between the charging electrode and said capillary tube ends in the presence of the gas stream to simultaneously form and charge an aerosol, a charge collector spaced from the charging electrode to receive and discharge the aerosol droplets, and an electrical load connected to the collectors to receive the power converted from the gas.

3. A power conversion device comprising a conduit for conducting gas at a suitable velocity, a source of gas connected to said conduit, a plurality of capillary tubes communicating with the interior of the conduit and disposed parallel to the longitudinal axis of the conduit, a dispensing end on each of the capillary tubes, a source of liquid connected to the capillary tubes, a charging electrode spaced from the dispensing end of the capillary tubes, said charging electrode having openings therein to receive the gas and liquid coming from the conduit, said openings each provided with a nozzle, a source of potential for applying a concentrated electric field between the charging electrode and said capillary tube ends in the presence of the gas stream to simultaneously form and charge an aerosol, a charge collector spaced from the charging electrode to receive and discharge the aerosol droplets, a collector screen disposed between the charging electrode and the charge collector, said screen having a potential charge of the same sign as the charge on the liquid in the aerosol, and an electrical load connected to the charge collector to receive the power converted from the gas.

4. A method of converting the internal and kinetic power of gas into electrical power comprising the steps of simultaneously forming and charging an aerosol by passing a gas at a suitable velocity through a conduit having a liquid containing capillary tube communicating with the interior thereof, directing the aerosol through an electrical field including a charging ring and an outwardly extending nozzle centrally disposed therein, producing a charged aerosol gas as it passes through the charging field and neutralizing the charge on the aerosol by collector means spaced from the charging ring to convert the kinetic power of the gas into electrical power.

References Cited by the Examiner

UNITED STATES PATENTS

| | | | |
|---|---|---|---|
| 2,302,185 | 11/42 | Campbell | 317—3 |
| 2,636,664 | 4/53 | Hertzler. | |
| 2,638,555 | 5/53 | Marks | 310—5 X |
| 3,122,882 | 3/64 | Schultz | 313—63 |

FOREIGN PATENTS

| | | |
|---|---|---|
| 688,433 | 3/53 | Great Britain. |
| 1,108,105 | 8/55 | France. |

OTHER REFERENCES

Publication: Physical Review, October 15, 1932, volume 42, pages 298, 299, 303 and 304.

MILTON O. HIRSHFIELD, *Primary Examiner.*

DAVID X. SLINEY, *Examiner.*